US009953448B2

(12) United States Patent
Eslami et al.

(10) Patent No.: US 9,953,448 B2
(45) Date of Patent: Apr. 24, 2018

(54) METHOD AND SYSTEM FOR IMAGE PROCESSING

(71) Applicant: SONY CORPORATION, Tokyo (JP)

(72) Inventors: Ramin Eslami, Milpitas, CA (US); Yu Kimishima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 267 days.

(21) Appl. No.: 15/007,003

(22) Filed: Jan. 26, 2016

(65) Prior Publication Data
US 2017/0213345 A1    Jul. 27, 2017

(51) Int. Cl.
*G06K 9/00* (2006.01)
*G06T 11/60* (2006.01)
*G06T 7/12* (2017.01)
*G06T 7/136* (2017.01)

(52) U.S. Cl.
CPC ........... *G06T 11/60* (2013.01); *G06T 7/12* (2017.01); *G06T 7/136* (2017.01); *G06T 2207/10024* (2013.01); *G06T 2207/30236* (2013.01)

(58) Field of Classification Search
CPC . G06T 7/194; G06T 7/136; G06T 7/11; G06T 7/12
See application file for complete search history.

(56) References Cited

U.S. PATENT DOCUMENTS

| 2009/0219379 | A1* | 9/2009 | Rossato | H04N 5/272 348/14.01 |
| 2012/0294476 | A1  | 11/2012 | Wei et al. | |
| 2013/0308856 | A1* | 11/2013 | Carpenter | G06K 9/00335 382/164 |
| 2013/0336581 | A1* | 12/2013 | Datta | G06K 9/00785 382/165 |
| 2015/0248590 | A1* | 9/2015 | Li | G06K 9/00785 382/103 |
| 2017/0289434 | A1* | 10/2017 | Eslami | H04N 5/23212 |

FOREIGN PATENT DOCUMENTS

WO    2015013908 A    2/2015

OTHER PUBLICATIONS

Wangjiang Zhu et al, "Saliency Optimization From Robust Background Detection", Proceeding CVPR'14 Proceedings of the 2014 IEEE Conference on Computer Vision and Pattern Recognition, Apr. 11, 2014, pp. 8, IEEE Computer Society Washington, DC, USA.

Ali Borji et al, "Salient Object Detection: A Survey", Computer Vision and Pattern Recognition (CVPR), Nov. 18, 2014, pp. 26.

* cited by examiner

*Primary Examiner* — Wesley J Tucker
(74) *Attorney, Agent, or Firm* — Chip Law Group

(57) ABSTRACT

Various aspects of a system and method for image processing are disclosed herein. The method, implemented in an image-processing device, comprises computation of a plurality of boundary-connectedness values associated with a plurality of regions in a plurality of Boolean maps. The plurality of Boolean maps corresponds to a plurality of color channels of an image. The plurality of boundary-connectedness values associated with the plurality of regions is compared with a pre-specified threshold value. A first set of regions is identified from the plurality of regions in the plurality of Boolean maps as a set of foreground regions, based on the comparison.

19 Claims, 4 Drawing Sheets

METHOD AND SYSTEM FOR IMAGE PROCESSING

CROSS-REFERENCE TO RELATED APPLICATIONS/INCORPORATION BY REFERENCE

None.

FIELD

Various embodiments of the disclosure relate to a method and system for image processing. More specifically, various embodiments of the disclosure relate to a method and a system for image processing to identify salient objects.

BACKGROUND

With recent advancements in the field of computer vision and video processing, various models have been proposed for automatic and/or computational identification of salient objects in an image and/or a video stream. The identification of salient objects has various applications in the field of video surveillance, image retargeting, video summarization, robot control, navigation assistance, object recognition, adaptive compression, and/or the like. Further, identification of salient objects is useful in image processing techniques, such as auto-focus algorithms, wherein detection of a focus area is performed automatically for video and/or image-capturing devices.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for image processing is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
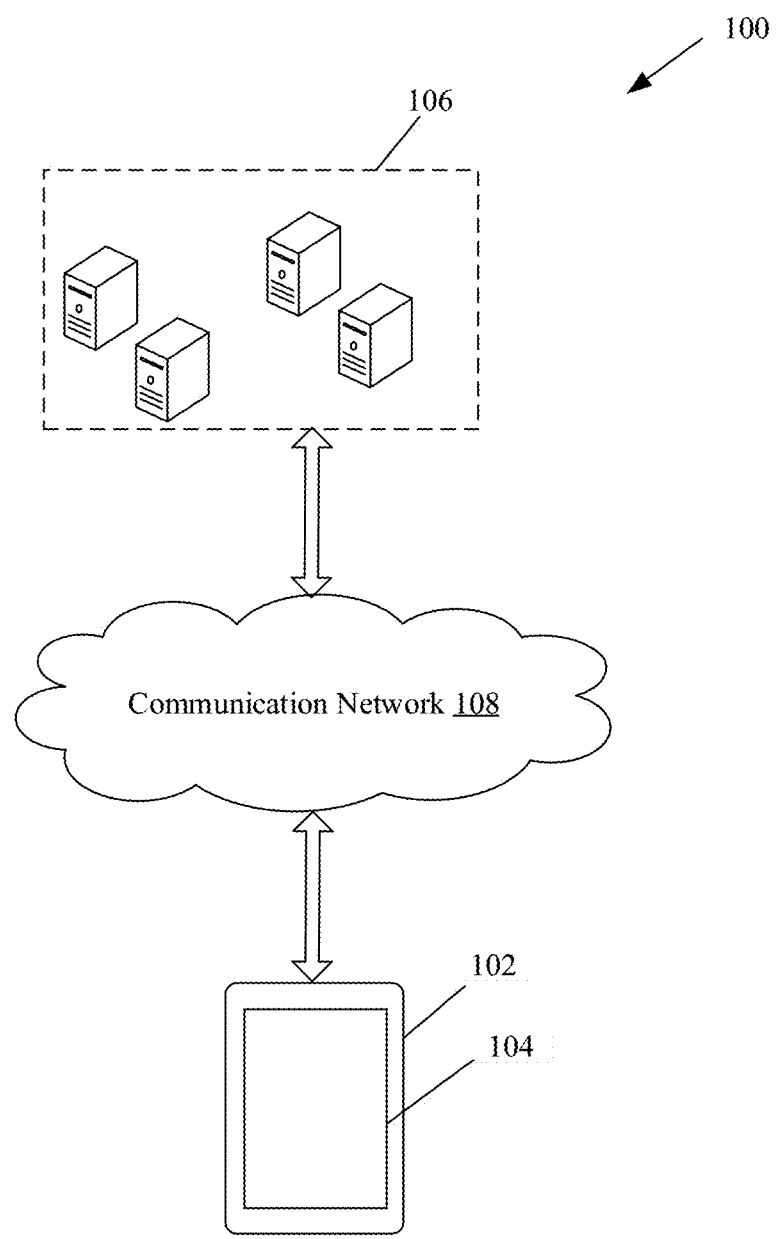
FIG. 1 is a block diagram that illustrates a network environment, in accordance with an embodiment of the disclosure.

A salient object may be identified, based on detection of region-of-interest (or region of attention) of a viewer. This region-of-interest may correspond to at least one of the foreground objects within a scene. Most computer vision models require a set of basic visual characteristics to detect such salient objects. The set of basic visual characteristics may include color contrast, intensity, orientation, texture, motion, spatial distance, and/or the like.

Various saliency detection approaches, such as a Boolean map saliency (BMS) approach, have been developed to remove non-salient background objects. The BMS approach leverages global topological cues that are known, to help in perceptual figure-ground segregation. The global topological cues may be based on one or more factors, such as surroundedness. The essence of surroundedness is the enclosure of topological relationship between a figure (such as an object), and a ground (such as foreground or background of an image). The relationship between the figure and ground is well defined and invariant to various transformations. Based on the surroundedness factor, all regions that touch one or more borders are removed from the Boolean maps that correspond to the image or video frame. However, the removal of all such regions that touch the one or more borders may decrease the performance of the BMS approach in case the removed regions correspond to foreground objects. Hence, there is a need for a technique that significantly improves the saliency results of the BMS approach.

The following described implementations may be found in the disclosed method and system for image processing. Exemplary aspects of the disclosure may include a method to compute, by an image-processing device, a plurality of boundary-connectedness values associated with a plurality of regions in a plurality of Boolean maps. In accordance with an embodiment, the plurality of Boolean maps may correspond to a plurality of color channels of an image. The method may include comparison of the plurality of boundary-connectedness values associated with the plurality of regions with a pre-specified threshold value. Based on the comparison, the method may include identification of at least a first set of regions of the plurality of regions as a set of foreground regions.

In accordance with an embodiment, a second set of regions of the plurality of regions may be identified as a set of background regions, based on the comparison. The identified first set of regions may be retained and the identified second set of regions may be removed from the plurality of Boolean maps to generate a plurality of processed Boolean maps.

In accordance with an embodiment, each of the plurality of boundary-connectedness values associated with the plurality of regions may be computed from a ratio of a count of pixels (of the corresponding region that touches one or more borders of the plurality of Boolean maps) and a square root of total count of pixels of the corresponding region. In accordance with an embodiment, one or more boundary-connectedness values associated with the first set of regions are less than or equal to the pre-specified threshold value. Further, one or more boundary-connectedness values associated with the second set of regions may exceed the pre-specified threshold value.

In accordance with an embodiment, the image may be a de-correlated image that may include one or more regions. The one or more regions may correspond to background or foreground objects. The plurality of regions of the one or more regions touches one or more borders of the image. Further, another plurality of regions of the one or more regions does not touch the one or more borders of the image.

In accordance with an embodiment, the method may comprise generation of the plurality of Boolean maps. The Boolean maps may be generated for each color channel of the plurality of color channels of the image and each threshold value of a set of threshold values, based on a set of binary values. In accordance with an embodiment, the set of binary values may be determined, based on a comparison of pixel intensity with the threshold value at each pixel location of the image.

In accordance with an embodiment, the method may further comprise a computation of the set of threshold values of each color channel of the plurality of color channels. The computation of the set of threshold values may be based on a step size, a minimum pixel value, and a maximum pixel value of the corresponding color channel. The step size may be based on a count of bits that represents pixel values of the plurality of color channels.

In accordance with an embodiment, the method may further comprise generation of a saliency map. The generation of the saliency map may comprise addition of the plurality of processed Boolean maps of the plurality of color channels. The method may further comprise normalization of the added plurality of processed Boolean maps.

In accordance with an embodiment, the method may comprise detection of a region-of-interest that may correspond to a salient region in the generated saliency map. In accordance with an embodiment, the detection of the region-of-interest may be based on one or more saliency parameters that correspond to the first set of regions identified as the set of foreground regions in the image. In such a case, the one or more saliency parameters are based on intensity values of the detected salient regions that exceed a threshold intensity value.

FIG. 1 is a block diagram that illustrates a network environment, in accordance with an embodiment of the disclosure. With reference to FIG. 1, there is shown a network environment 100. The network environment 100 may include an image-processing device 102, a display screen 104, a plurality of cloud-based resources 106, and a communication network 108. The image-processing device 102 may comprise the display screen 104. The image-processing device 102 may be communicatively coupled to the plurality of cloud-based resources 106, via the communication network 108.

The image-processing device 102 may comprise suitable logic, circuitry, interfaces, and/or code that may be configured to process an image or a video frame. The image or video frame may be processed for identification of a set of foreground regions that may touch one or more borders of the image or video frame. The image-processing device 102 may be further configured to detect one or more salient objects from the processed image or video frame. The image-processing device 102 may be further configured to adjust auto-focus, based on the one or more salient objects detected in the processed image or video frame. Examples of the image-processing device 102 may include, but are not limited to, a smartphone, a camera, a tablet computer, a laptop, and/or a wearable electronic device.

The display screen 104 may comprise suitable circuitry and/or interfaces that may be configured to display the image or video frame. The display screen 104 may be further configured to display the one or more salient objects, on which the auto-focus is adjusted by the image-processing device 102. The display screen 104 may be realized through several known technologies, such as but are not limited to, Liquid Crystal Display (LCD) display, Light Emitting Diode (LED) display, and/or Organic LED (OLED) display technology.

The plurality of cloud-based resources 106 may comprise one or more servers that may provide image data to one or more subscribed electronic devices, such as the image-processing device 102. The plurality of cloud-based resources 106 may be implemented by use of several technologies that are well known to those skilled in the art. The one or more servers from the plurality of cloud-based resources 106, may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

The communication network 108 may include a medium through which the image-processing device 102 may communicate with the one or more servers, such as the plurality of cloud-based resources 106. Examples of the communication network 108 may include, but are not limited to, a Dedicated Short-Range Communication (DSRC) network, a Mobile Ad-Hoc Network (MANET), a Vehicular Ad-Hoc Network (VANET), an Intelligent Vehicular Ad-Hoc Network (InVANET), an Internet-Based Mobile Ad-Hoc Network (IMANET), a Wireless Sensor Network (WSN), a Wireless Mesh Network (WMN), the Internet, a cellular network, such as a Long-Term Evolution (LTE) network, a cloud network, a Wireless Fidelity (Wi-Fi) network, and/or a Wireless Local Area Network (WLAN). Various devices in the network environment 100 may be configured to connect to the communication network 108, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, EDGE, Infrared (IR), and/or Bluetooth (BT) communication protocols.

In operation, the image-processing device 102 may be configured to receive an image or a video frame from the plurality of cloud-based resources 106, via the communication network 108. In accordance with an embodiment, the image-processing device 102 may be configured to receive the image or video frame from an image-capturing unit (described in FIG. 2), installed within or communicatively coupled with the image-processing device 102. In accordance with an embodiment, the image-processing device 102 may be configured to retrieve a pre-stored image or video frame from a local memory. The image or video frame may include one or more background and foreground objects.

In accordance with an embodiment, the image-processing device 102 may be configured to perform de-correlation of the plurality of color channels of the image or video frame. The de-correlation of the plurality of color channels of the image or video frame may reduce cross-correlation within the plurality of color channels. The image-processing device 102 may apply one or more de-correlation or whitening techniques known in the art, such as a matched linear filter, to perform such de-correlation of the plurality of color channels.

In accordance with an embodiment, the image-processing device 102 may be configured to determine a set of threshold values for each color channel of the plurality of color channels. Each threshold value from the set of threshold values (that corresponds to each color channel) may range from a minimum pixel value to a maximum pixel value. In accordance with an embodiment, each threshold value from the set of threshold values may further depend on a step size. The step size may be based on a count of bits that represents pixel values of one or more pixels of the corresponding color channel.

In accordance with an embodiment, the image-processing device 102 may be configured to determine pixel values of the one or more pixels in each color channel of the de-correlated image. The image-processing device 102 may be further configured to compare the determined pixel values of the one or more pixels, with each threshold value from the set of threshold values that correspond to the color channel. Further, the image-processing device 102 may be configured to assign a first pre-defined binary value, such as "1", to each of the one or more pixel locations, whose pixel values exceed the corresponding threshold values from the set of threshold values. The image-processing device 102 may be further configured to assign a second pre-defined binary value, such as "0", to each of the one or more pixel locations, whose pixel values are less than the corresponding threshold values from the set of threshold values.

In accordance with an embodiment, the image-processing device 102 may be configured to generate the plurality of Boolean maps for the plurality of color channels and the set of threshold values. The generation may be based on the assignment of the first and second pre-defined values. Each Boolean map from the plurality of Boolean maps may comprise one or more regions. Each region from the one or more regions in a Boolean map may include a group of neighbor pixels with similar pre-defined pixel values. Such one or more regions may correspond to the background or foreground objects.

In accordance with an embodiment, the image-processing device 102 may be configured to detect a plurality of regions in the plurality of Boolean maps. The detected plurality of regions may be from the one or more regions that touch one or more borders of the corresponding Boolean map. In accordance with an embodiment, the image-processing device 102 may be configured to detect another plurality of regions in the plurality of Boolean maps. The detected other plurality of regions may not touch the one or more borders of the corresponding Boolean map. The image-processing device 102 may apply one or more morphological operations known in the art, to identify such plurality of regions and other plurality of regions.

In accordance with an embodiment, the image-processing device 102 may be configured to determine the count of pixels of each region from the plurality of regions that touch the border of the plurality of Boolean maps. The image-processing device 102 may be further configured to determine a total count of pixels of each region from such plurality of regions.

In accordance with an embodiment, the image-processing device 102 may be configured to determine a ratio of the determined count of pixels and a square root of the total count of pixels of the corresponding region. The determined count of pixels may correspond to one or more pixels that touch the border in each region from the plurality of regions in the plurality of Boolean maps. Based on the determined ratio, the image-processing device 102 may be configured to compute boundary-connectedness values associated with each of the plurality of regions in the plurality of Boolean maps.

In accordance with an embodiment, the boundary-connectedness value may represent an extent to which a plurality of pixels present in the corresponding region touches the one or more borders of the image or video frame. The image-processing device 102 may be configured to compare each boundary-connectedness value of the plurality of boundary-connectedness values with a pre-specified threshold value.

In accordance with an embodiment, the computed plurality of boundary-connectedness values associated with some regions may be less than or equal to the pre-specified threshold value. Such regions may be identified as a first set of regions that may correspond to a set of foreground objects that are required to be retained in the plurality of Boolean maps. In accordance with an embodiment, the computed plurality of boundary-connectedness values associated with other regions may exceed the pre-specified threshold value. Such regions may be identified as a second set of regions that are required to be removed from the plurality of Boolean maps.

In accordance with an embodiment, the image-processing device 102 may be configured to remove the second set of regions as the corresponding boundary-connectedness values exceed the pre-specified threshold value. The image-processing device 102 may be further configured to retain the first set of regions with the corresponding boundary-connectedness values less than the pre-specified threshold value. The plurality of Boolean maps which selectively comprise the retained first set of regions may be hereinafter referred to as, "a plurality of processed Boolean maps".

In accordance with an embodiment, the image-processing device 102 may be configured to add the plurality of processed Boolean maps. The image-processing device 102 may be further configured to normalize the added plurality of processed Boolean maps by a value that corresponds to a total count of the plurality of Boolean maps.

In accordance with an embodiment, the image-processing device 102 may generate a saliency map. In accordance with an embodiment, the generation of saliency maps may include a post-processing of the normalized plurality of processed Boolean maps, based on various image processing techniques known in the art.

In accordance with an embodiment, the image-processing device 102 may be configured to detect a region-of-interest that corresponds to a salient region in the generated saliency map. In accordance with an embodiment, the detection of the region-of-interest may be based on one or more saliency parameters associated with the regions that correspond to the first set of regions identified as a set of foreground regions in the image. The one or more saliency parameters may be based on intensity values of the detected salient regions that exceed a threshold intensity value. The image-processing device 102 may be further configured to adjust auto-focus on one or more salient objects that correspond to the detected one or more salient regions.

Figure 2:
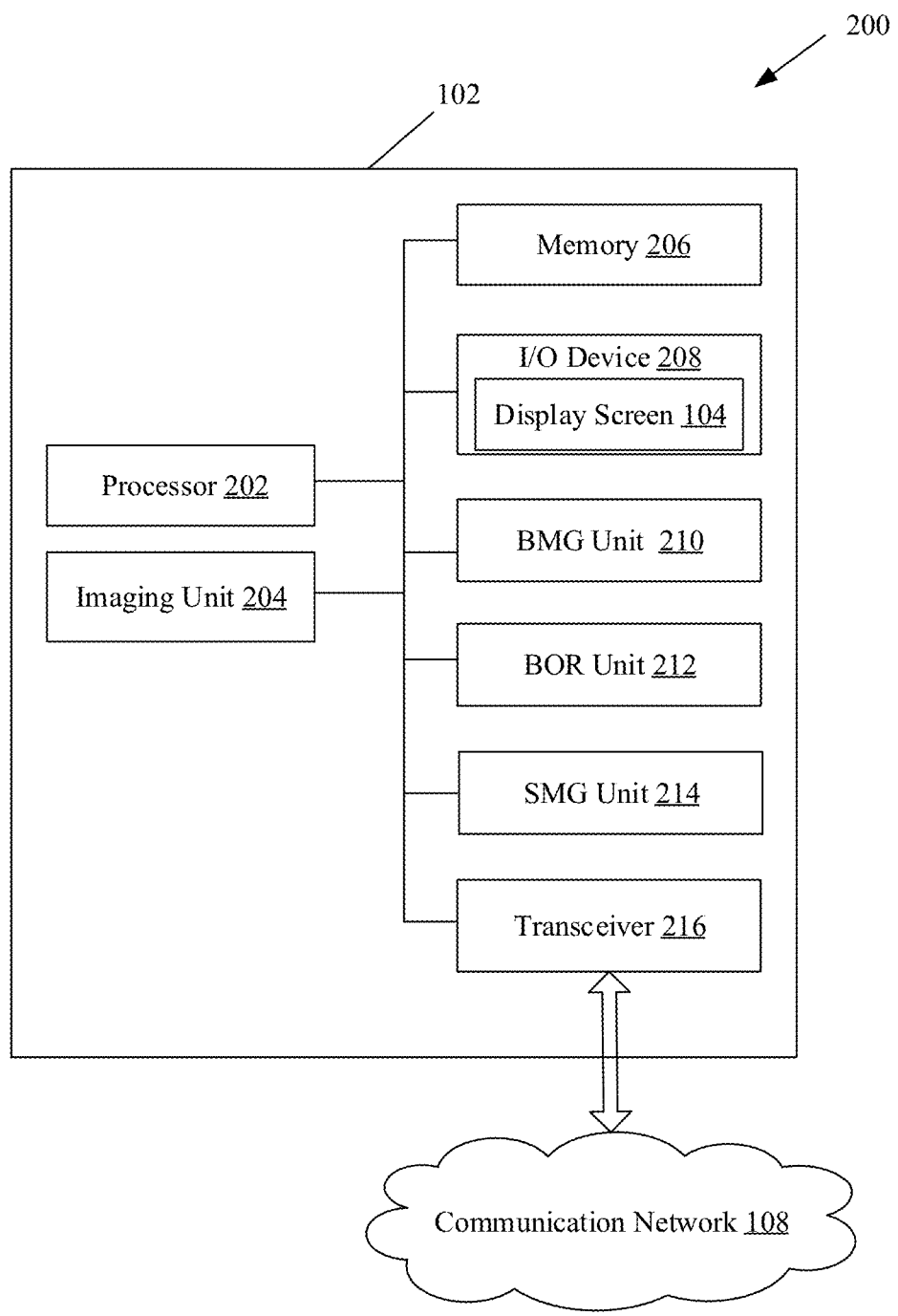
FIG. 2 is a block diagram that illustrates various components of an image-processing device, in accordance with an embodiment of the disclosure.

FIG. 2 is a block diagram that illustrates various components of an image-processing device, in accordance with an embodiment of the disclosure. With reference to FIG. 2, there is shown the image-processing device 102, which may include a processor 202, an imaging unit 204, a memory 206, an input/output (I/O) device 208, a Boolean map generation (BMG) unit 210, a boundary object removal (BOR) unit 212, a saliency map generation (SMG) unit 214, and a transceiver 216. The I/O device 208 may further include the display screen 104. In accordance with an embodiment, the image-processing device 102 may be communicatively coupled with the other units, such as the plurality of cloud-based resources 106, via the communication network 108.

The processor 202 may comprise suitable logic, circuitry, interfaces, and/or code that may be configured to process an image or a video frame. The image or video frame may be processed for identification of a set of foreground regions that may touch one or more borders of the image or video frame. The processor 202 may be further configured to adjust auto-focus, based on one or more salient objects detected in the processed image or video frame. The processor 202 may be communicatively coupled with the BMG unit 210, the BOR unit 212 and the SMG unit 214, to process the image or video frame. Examples of the processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

The imaging unit 204 may comprise suitable logic, circuitry, interfaces, and/or code that may be configured to capture one or more images and/or video frames within a field-of-view (FOV) of the imaging unit 204. The imaging unit 204 may further generate visual representations of the captured one or more images and/or video frames. The imaging unit 204 may include a lens assembly and an image sensor that may enable the imaging unit 204 to capture the one or more images and/or video frames. The image sensor of the imaging unit 204 may be implemented by use of a charge-coupled device (CCD) technology, complementary metal-oxide-semiconductor (CMOS) technology and/or the like.

The memory 206 may comprise suitable logic, circuitry, and/or interfaces that may be configured to store a machine code and/or a computer program with at least one code section executable by the processor 202. In accordance with an embodiment, the memory 206 may be further configured to store the one or more images and/or video frames captured by the imaging unit 204. In accordance with an embodiment, the memory 206 may be further configured to store one or more images and/or video frames received from the external unit, such as the plurality of cloud-based resources 106, via the transceiver 216. Examples of types of the memory 206 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), and/or a Secure Digital (SD) card, and/or cache memory.

The I/O device 208 may comprise suitable logic, circuitry, interfaces, and/or code that may be configured to receive an input from a user (not shown). The input from the user may correspond to a command to capture an image and/or a video frame of a scene. The I/O device 208 may be further configured to provide an intermediate output and a final output to the user. The intermediate output may correspond to visualization of a saliency map. The final output may correspond to a visualization may include one or more salient objects in the captured image and/or video frame of the scene, on which the auto-focus is adjusted by the processor 202. The I/O device 208 may comprise various input and output devices that may be configured to communicate with the processor 202. Examples of the input devices may include, but are not limited to, the imaging unit 204, a camcorder, a touch screen, a keyboard, a mouse, a joystick, a microphone, a motion sensor, a light sensor, and/or a docking station. Examples of the output devices may include, but are not limited to, the display screen 104, a projector screen, and/or a speaker. The display screen 104 may be further configured to display the one or more salient objects, on which the auto-focus is adjusted by the processor 202. The display screen 104 may be configured to receive one or more input actions from the one or more users, via a touch-sensitive screen. Such one or more input actions may be received from the one or more users by means of a virtual keypad, a stylus, touch-based input actions, and/or a gesture. The display screen 104 may be realized through several known technologies such as, but not limited to, Liquid Crystal Display (LCD) display, Light Emitting Diode (LED) display, plasma display, and/or Organic LED (OLED) display technology.

The BMG unit 210 may comprise suitable logic, circuitry, interfaces, and/or code that may be configured to compute the set of threshold values for each color channel of the plurality of color channels in the image or video frame. The BMG unit 210 may be further configured to generate a Boolean map for each color channel of the plurality of color channels of the image and for each threshold value from the set of threshold values. The generation of Boolean map may be based on a set of binary values. The BMG unit 210 may be implemented, based on a number of processor technologies known in the art.

The BOR unit 212 may comprise suitable logic, circuitry, interfaces, and/or code that may be configured to compute the plurality of boundary-connectedness values associated with the plurality of regions in the plurality of Boolean maps. Based on the computed plurality of boundary-connectedness values, the BOR unit 212 may be configured to generate a plurality of processed Boolean maps. The BOR unit 212 may be implemented, based on a number of processor technologies known in the art.

The SMG unit 214 comprises suitable logic, circuitry, interfaces, and/or code that may be configured to add the plurality of processed Boolean maps. The SMG unit 214 may be further configured to normalize the added plurality of processed Boolean maps by a value which corresponds to a total count of Boolean maps. In accordance with an embodiment, the SMG unit 214 may be further configured to generate a saliency map, based on post-processing of the normalized plurality of processed Boolean maps. The SMG unit 214 may be implemented, based on a number of processor technologies known in the art.

The transceiver 216 may comprise suitable logic, circuitry, interfaces, and/or code that may be configured to transmit as well as receive the image to/from the one or more communicatively coupled units. The one or more communicatively coupled units may include the processor 202, the imaging unit 204, the memory 206, the I/O device 208, the BMG unit 210, the BOR unit 212, and/or the SMG unit 214. The transceiver 216 may be configured to communicate with the plurality of cloud-based resources 106, via the communication network 108, as shown in FIG. 1. The transceiver 216 may be implemented by technologies known in the art, to support wired or wireless communication of the image-processing device 102, with the communication network 108. Various components of the transceiver 216 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 216 may communicate, via wireless communication, with networks (such as the Internet and/or the Intranet) and/or a wireless network (such as a cellular telephone network, a wireless local area network (LAN) and/or a metropolitan area network (MAN)). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the transceiver 216 in the image-processing device 102 may be configured to receive an image from the imaging unit 204, via the communication network 108. The image may correspond to a scene of a landscape, a cityscape, a football match, a street-play, and/or the like. In such a case, the imaging unit 204 may be configured to capture the image in response to a request triggered by a user, based on an action, such as hardware or software button-press action, at the image-processing device 102.

In accordance with an embodiment, the transceiver 216 may be configured to communicate the received image to the processor 202. In accordance with an embodiment, the processor 202 may be configured to receive the image from the memory 206. In such a case, the image may be temporarily stored in the memory 206. In accordance with an embodiment, the processor 202 may be configured to receive the image from the memory 206. In accordance with an embodiment, the image may be of a pre-specified resolution in the plurality of color channels. In accordance with an embodiment, the image may comprise background and foreground objects.

In accordance with an embodiment, the processor 202 may be configured to perform de-correlation of the plurality of color channels of the image, to reduce cross-correlation within the plurality of color channels. The de-correlation may be performed by the processor 202, based on one or more de-correlation techniques known in the art, such as a matched linear filter.

In accordance with an embodiment, the processor 202 may communicate the image to the BMG unit 210. The BMG unit 210 may compute a count of threshold values for each color channel of the plurality of color channels in the image. In accordance with an embodiment, the computation of the count of threshold values may depend on one or more parameters. The one or more parameters may comprise a minimum pixel value, a maximum pixel value, and/or a step size. Values of the one or more parameters may vary for each color channel of the plurality of color channels. The step size may be based on a count of bits that represent pixel values of the plurality of color channels. In accordance with an embodiment, the count of threshold values may be expressed mathematically by equation (1a), as follows:

$$m = 1 + \text{floor}([\max(u) - \min(u)]/s) \tag{1a}$$

where "m" represents the count of threshold values, "max (u)" represents a maximum pixel value, "min (u)" represents a minimum pixel value, and "s" represents a pre-configured step size. The function floor(x) returns the largest integer value smaller than x, for example floor (1.6)=1. Further, the set of threshold values, "T", may be determined based on the count of threshold values, as determined based on the equation (1a), and the pre-configured step size, "s". The set of threshold values, "T", may be expressed mathematically by equation (1b), as follows:

$$T = \{0, s, 2*s, \ldots, (m-1)*s\} \tag{1b}$$

In accordance with an embodiment, the BMG unit 210 may be configured to compare the pixel value of each pixel location with each threshold value from the set of threshold values within the image. Based on the comparison, the BMG unit 210 may be configured to assign a pre-specified binary value, such as "0" or "1", to each pixel location in the image. Accordingly, a first pre-defined binary value, such as "1", may be assigned to each of the one or more pixel locations when pixel values exceed corresponding threshold value. Further, a second pre-defined binary value, such as "0", may be assigned to each of the one or more pixel locations when pixel values are less than the corresponding threshold value.

The BMG unit 210 may be further configured to generate a plurality of Boolean maps for each color channel and each threshold value of each color channel, based on the assigned pre-specified binary values. Each Boolean map from the plurality of Boolean maps may comprise one or more regions that correspond to background and foreground objects. Each region from the one or more regions in a Boolean map may include a group of neighbor pixels with similar pre-defined pixel values. In accordance with an embodiment, the comparison of the pixel value of each pixel location with the set of threshold values and assignment of binary values to each pixel may be mathematically expressed by equation (2), as follows:

$$b[i,j] \begin{cases} 1, & \text{if } u[i,j] > T_h \\ 0, & \text{otherwise} \end{cases} \tag{2}$$

where "$T_h$" represents threshold value from the set of threshold values, "T", "u [i, j]" represents pixel value at row "i" and column "j", "b[i, j]" represents binary value assigned to pixel at row "i" and column "j", and "1" and "0" represents pre-specified binary values.

In accordance with an embodiment, the BMG unit 210 may be configured to detect a plurality of regions from the one or more regions that may touch one or more borders of the corresponding Boolean map. In accordance with an embodiment, the BMG unit 210 may be configured to detect another plurality of regions in the plurality of Boolean maps. The detected other plurality of regions may not touch the one or more borders of the corresponding Boolean map. The BMG unit 210 may apply one or more morphological operations known in the art, to identify such plurality of regions and other plurality of regions.

In accordance with an embodiment, the BMG unit 210 may communicate the generated plurality of Boolean maps and the detected plurality of regions to the BOR unit 212. The BOR unit 212 may be configured to compute a boundary-connectedness value of each region from the plurality of regions associated with the plurality of Boolean maps. In accordance with an embodiment, each of the plurality of boundary-connectedness values associated with the plurality of regions may be computed. The computation may be based on a ratio of the count of pixels and a square root of total count of pixels of the corresponding region. The count of pixels may correspond to one or more pixels that touch the border in each region from the plurality of regions in the plurality of Boolean maps. In accordance with an embodiment, the computation of the boundary-connectedness value may be mathematically expressed by equation (3), as follows:

$$BC = \frac{\text{Count of pixels in } R \text{ that touch the border}}{\sqrt{\text{Total count of pixels in } R}} \tag{3}$$

where "BC" represents boundary-connectedness value and "R" represents region in the Boolean map. Theoretically, the value of "BC" may represent an extent to which a plurality of pixels present in the corresponding region "R" touches the one or more borders of the Boolean map.

The BOR unit 212 may be further configured to compare each of the plurality of boundary-connectedness values with a pre-specified threshold value. In accordance with an embodiment, the plurality of boundary-connectedness values associated with a set of regions may be less than or equal to the pre-specified threshold value. Such regions may be identified as a first set of regions that may correspond to a set of foreground objects that are required to be retained in the plurality of Boolean maps. In accordance with an embodiment, the plurality of boundary-connectedness values associated with another set of regions may exceed the pre-specified threshold value. Such regions may be identified as a second set of regions that are required to be removed from the plurality of Boolean maps. Such second set of regions may correspond to the non-salient foreground or background regions of the image.

In accordance with an embodiment, the BOR unit 212 may be configured to remove the second set of regions as the corresponding boundary-connectedness values exceed the pre-specified threshold value. The BOR unit 212 may be further configured to retain the first set of regions with the corresponding boundary-connectedness values less than the pre-specified threshold value. Accordingly, the BOR unit 212 may be configured to generate a plurality of processed Boolean maps. The second set of regions may be removed as the corresponding boundary-connectedness values exceed the pre-specified threshold value. The BOR unit 212 may be configured to generate a plurality of processed Boolean maps, as per the mathematical equation (4), as follows:

$$R = \begin{cases} 0 \text{ (removed)}, & \text{if } BC > \theta \\ 1 \text{ (retain)}, & \text{otherwise} \end{cases} \quad (4)$$

where "R" represents a region in a Boolean map, "BC" represents the boundary-connectedness value of the region "R", "θ" represents the pre-specified threshold value, and "1" and "0" represents pre-specified binary values.

In accordance with an embodiment, the BOR unit 212 may be configured to communicate the plurality of Boolean maps to the SMG unit 214. In accordance with an embodiment, the SMG unit 214 may be configured to add the plurality of processed Boolean maps. The SMG unit 214 may be further configured to normalize the added plurality of processed Boolean maps by a value that corresponds to a total count of Boolean maps. In accordance with an embodiment, the normalization of the plurality of processed Boolean maps may be mathematically expressed by equation (5), as follows:

$$B_n = \frac{1}{n} \sum_{k=1}^{n} B_k \quad (5)$$

where "$B_n$" represents the normalized plurality of processed Boolean maps, "$B_k$" represents $k^{th}$ processed Boolean map, and "n" represents total count of Boolean maps.

In accordance with an embodiment, the SMG unit 214 may generate a saliency map. In accordance with an embodiment, the generation of saliency maps may include a post-processing of the normalized plurality of processed Boolean maps. The post-processing of the normalized plurality of processed Boolean maps may be based on various image processing techniques known in the art. In accordance with an embodiment, the SMG unit 214 may be configured to detect a region-of-interest that corresponds to a salient region in the generated saliency map. In accordance with an embodiment, the detection of the region-of-interest may be based on one or more saliency parameters associated with the regions that correspond to the first set of regions identified as a set of foreground regions in the image. The one or more saliency parameters may be based on intensity values of the detected salient regions that exceed a threshold intensity value. The SMG unit 214 may further identify at least one salient object that corresponds to the detected region-of-interest in the generated saliency map. The identification of the salient object(s) may be incorporated in various application fields, such as video surveillance, image retargeting, video summarization, robot control, navigation assistance, object recognition, adaptive compression, and/or the like. The identification of the salient objects may be further useful in image processing techniques (such as auto-focus algorithms), for an automatic detection of a focus area in the captured image and/or the video frame.

Figure 3:
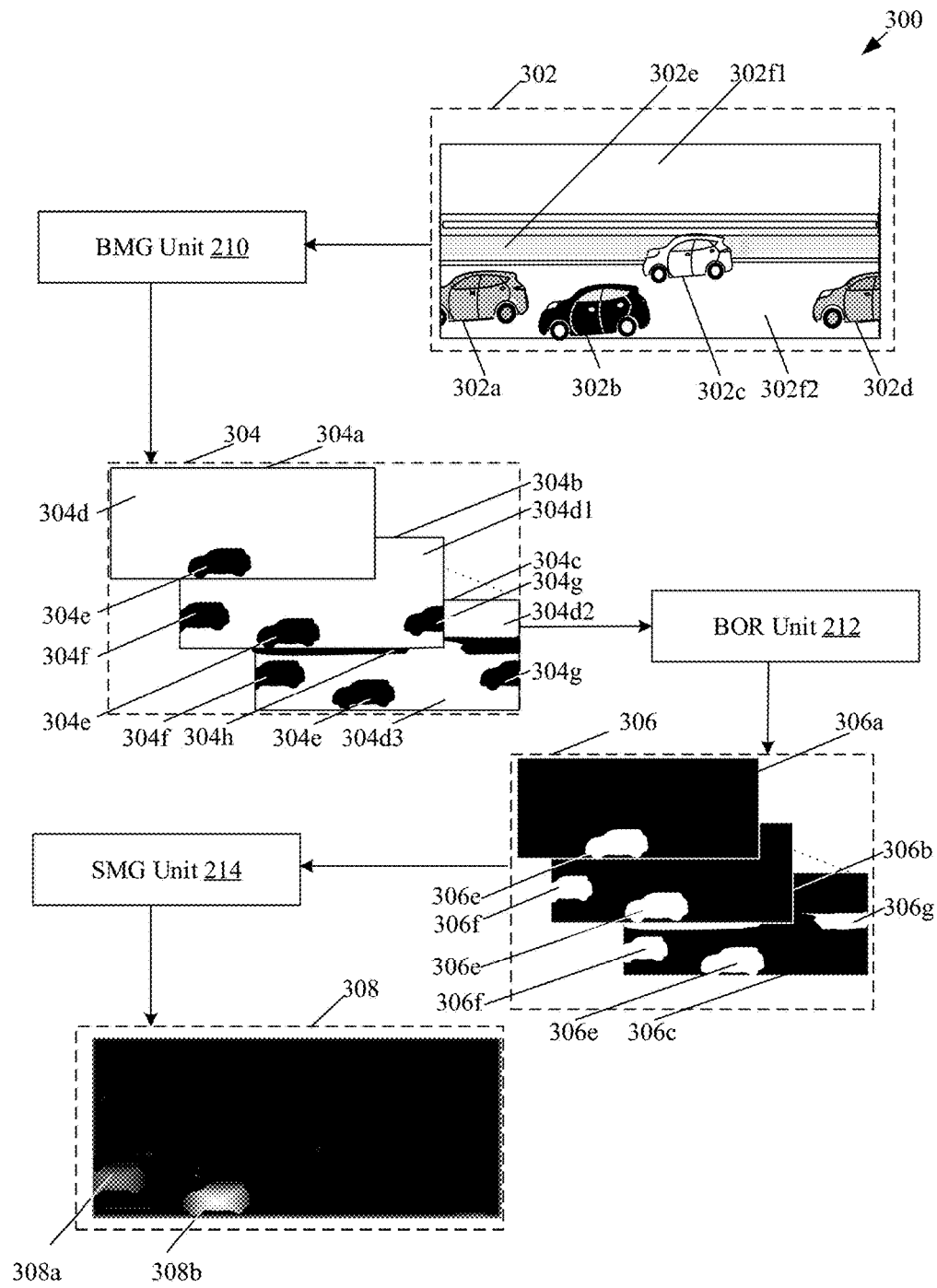
FIG. 3 illustrates an exemplary scenario for implementation of the disclosed method and system for image processing, in accordance with an embodiment of the disclosure.

FIG. 3 illustrates an exemplary scenario for implementation of the disclosed method and system for image processing, in accordance with an embodiment of the disclosure. FIG. 3 is explained in conjunction with FIG. 1 and FIG. 2. With reference to FIG. 3, there is shown an arrangement 300 of various components of the image-processing device 102, as described in FIG. 2. In accordance with such arrangement 300, there is shown a video frame 302 that may comprise a plurality of regions. The plurality of regions may correspond to a plurality of objects, such as a first car 302a, a second car 302b, a third car 302c, a fourth car 302d, a boundary slab 302e, a first background region 302f1, and a second background 302f2.

There is further shown a plurality of Boolean maps 304, such as a first Boolean map 304a, a second Boolean map 304b, and a third Boolean map 304c. Each Boolean map of the plurality of Boolean maps 304 may comprise a plurality of regions, based on a pre-specified threshold value and pixel values and predominant color channels of corresponding objects, such as the plurality of objects 302a to 302f2. In accordance with the exemplary scenario, such plurality of regions may be selectively shown in each of the plurality of Boolean maps 304. For example, the first Boolean map 304a may include regions 304d and 304e. The region 304d collectively corresponds to all regions (removed regions) in the video frame 302 except the second car 302b. The region 304e corresponds to the second car 302b. In addition to the region 304e, the second Boolean map 304b may further include regions 304f and 304g that correspond to the first car 302a and the fourth car 302d, respectively. The new region 304d1 in the second Boolean map corresponds to all regions (removed regions) in the video frame 302 except the cars 302a, 302b, and 302d. The third Boolean map 304c may include the regions 304e, 304f, 304g, 304h, and 304d2 that correspond to the second car 302b, the first car 302a, the fourth car 302d, the boundary slab 302e, and the first background region 302f1, respectively. It may also include region 304d3 that corresponds to the third car 302c and the second background region 302f2.

There is further shown a plurality of processed Boolean maps 306 that may include a first processed Boolean map 306a, a second processed Boolean map 306b, and a third processed Boolean map 306c. The plurality of processed Boolean maps 306 may include the plurality of regions that corresponds to the plurality of objects, as discussed above. The plurality of regions in the plurality of processed Boolean maps 306 may further include regions 306e, 306f, and 306g, that corresponds to the objects, such as the second car 302b, the first car 302a, and the boundary slab 302e, respectively. The plurality of regions in the plurality of processed Boolean maps 306 may not include a regions that corresponds to the fourth car 302d, the first background region 302f1, and the second background region 302f2. There is further shown a final saliency map 308 that may comprise regions-of-interest, such as regions 308a and 308b, which correspond to the first car 302a and the second car 302b, respectively.

In accordance with the exemplary scenario, the transceiver 216 in the image-processing device 102 may be configured to receive a video stream from the imaging unit 204, via the communication network 108. The video stream may include a plurality of video frames, such as the video frame 302. In such a case, the imaging unit 204 may be configured to capture the video stream in response to a request triggered by a user, based on an action, such as hardware or software button-press action. The video frame 302 may correspond to a video stream of car rally. The video frame 302 may comprise a plurality of regions. The plurality of regions may correspond to a plurality of objects, such as the first car 302a, the second car 302b, the third car 302c, the fourth car 302d, the boundary slab 302e, the first background region 302f1, and the second background region 302f2.

The transceiver 216 may be configured to communicate the received video frame 302 to the processor 202. In accordance with an embodiment, the processor 202 may be configured to identify the plurality of objects as background and foreground objects. In accordance with an embodiment, the processor 202 may be configured to perform de-correlation of the plurality of color channels of the video frame 302 to reduce cross-correlation within the plurality of color channels, based on one or more de-correlation techniques known in the art, such as a matched linear filter.

In accordance with an embodiment, the processor 202 may communicate the video frame 302 to the BMG unit 210. The BMG unit 210 may compute a count of threshold values for each color channel of the plurality of color channels in the video frame 302. The computation of the count of threshold values may depend on one or more parameters, such as a minimum pixel value, a maximum pixel value, and a step size. The computation of the count of threshold values and the set of threshold values may be performed based on the equations (1a) and (1b), as described in FIG. 2.

The BMG unit 210 may be further configured to compare the pixel value of each pixel location with each threshold value from the set of threshold values within the video frame 302. Based on the comparison, the BMG unit 210 may be configured to assign a first pre-defined binary value, such as "1", to each of the one or more pixel locations with pixel values that exceed the corresponding threshold value. Further, the BMG unit 210 may be configured to assign a second pre-defined binary value, such as "0", to each of the one or more pixel locations with pixel values that are less than the corresponding threshold value. The comparison of the pixel value of each pixel location with the set of threshold values and assignment of binary values to each pixel may be performed based on the mathematically expressed equation (2), as described in FIG. 2. The BMG unit 210 may generate the plurality of Boolean maps 304 for each color channel of the plurality of color channels of the video frame 302 and each threshold value from the set of threshold values, based on the set of binary values.

In accordance with an embodiment, the BMG unit 210 may determine one or more regions 304d to 304h, 304d1, 304d2, and 304d3 in the plurality of Boolean maps 304, as described above. In accordance with an embodiment, the BMG unit 210 may be further configured to remove a plurality of regions from the plurality of Boolean maps 304 that corresponds to one or more objects, such as third car 302c. The plurality of regions may be removed as such one or more objects may comprise a plurality of pixels with pixel intensity value similar to the first background region 302f1 and the second background region 302f2. The BMG unit 210 may be configured to detect a plurality of regions (from the one or more regions 304d to 304h, 304d1, 304d2, and 304d3) that may touch the borders of the video frame 302. Such plurality of regions may correspond to the first car 302a, the second car 302b, the fourth car 302d, the boundary slab 302e, the first background region 302f1, and the second background region 302f2. The BMG unit 210 may be further configured to detect a plurality of regions (not shown) that does not touch the borders of the video frame 302, and thus, may be primarily a foreground region.

The BMG unit 210 may communicate the generated plurality of Boolean maps 304, and the plurality of determined regions 304d to 304h, 304d1, 304d2, and 304d3 to the BOR unit 212. Accordingly, the BOR unit 212 may compute the plurality of boundary-connectedness values associated with the regions 304d to 304h, 304d1, 304d2, and 304d3 in the plurality of Boolean maps 304. Each of the plurality of boundary-connectedness values associated with the plurality of regions, such as the regions 304d to 304h, 304d1, 304d2, and 304d3, may be computed based on a ratio of count of pixels of corresponding region and a square root of total count of pixels of the corresponding region. The determined count of pixels may correspond to one or more pixels that touch the border in each region from the plurality of regions in the plurality of Boolean maps. Such computation of the boundary-connectedness values may be performed based on the mathematically expressed equation (3), as described in FIG. 2.

Further, the BOR unit 212 may compare each boundary-connectedness value with a pre-specified threshold value from the set of threshold values. In an instance, a boundary-connectedness value of a region, such as the region that corresponds to the first car 302a, is less than the pre-specified threshold value. Similarly, the boundary-connectedness values of the regions that corresponds to the second car 302b and the boundary slab 302f, are less than the pre-specified threshold value. Such regions, depicted by regions 306f, 306e, and 306g, respectively, may be identified as a first set of regions. In such a case, the BOR unit 212 may retain each region from the identified first set of regions, in the generated plurality of processed Boolean maps 306. In another instance, a boundary-connectedness values of regions that correspond to the fourth car 302d, the first background region 302f1, and the second background region 302f2 together with the third car 302c, exceeds the pre-specified threshold value. Such a region may be identified as a second set of regions. In such a case, the BOR unit 212 may generate the plurality of processed Boolean maps 306, without the regions that correspond to the fourth car 302d, the first background region 302f1, the second background region 302f2, and the third car 302c.

The BOR unit 212 may be configured to communicate the plurality of processed Boolean maps 306 to the SMG unit 214. The SMG unit 214 may add the plurality of processed Boolean maps 306 together. Further the SMG unit 214 may normalize the added plurality of processed Boolean maps 306 by a value that corresponds to a total count of Boolean maps, such as "3". The normalization of the added plurality of processed Boolean maps 306 may be mathematically expressed by the equation (5), as described in FIG. 2. Based on the normalization, the SMG unit 214 may generate the saliency map 308, by use of one or more image processing techniques known in the art. The saliency map 308 may include a plurality of salient regions, such as the regions 308a and 308b.

The SMG unit 214 may be configured to detect a region-of-interest that corresponds to a salient region, such as the salient region 308b, from plurality of regions-of-interest in the generated saliency map 308. Such a detection of the region-of-interest may be based on one or more salient parameters, such as high intensity value, bright color and high speed of the first car 302b. Accordingly, the processor 202 may automatically focus on the salient object, such as the second car 302b, in the captured video frame 302.

Figure 4:
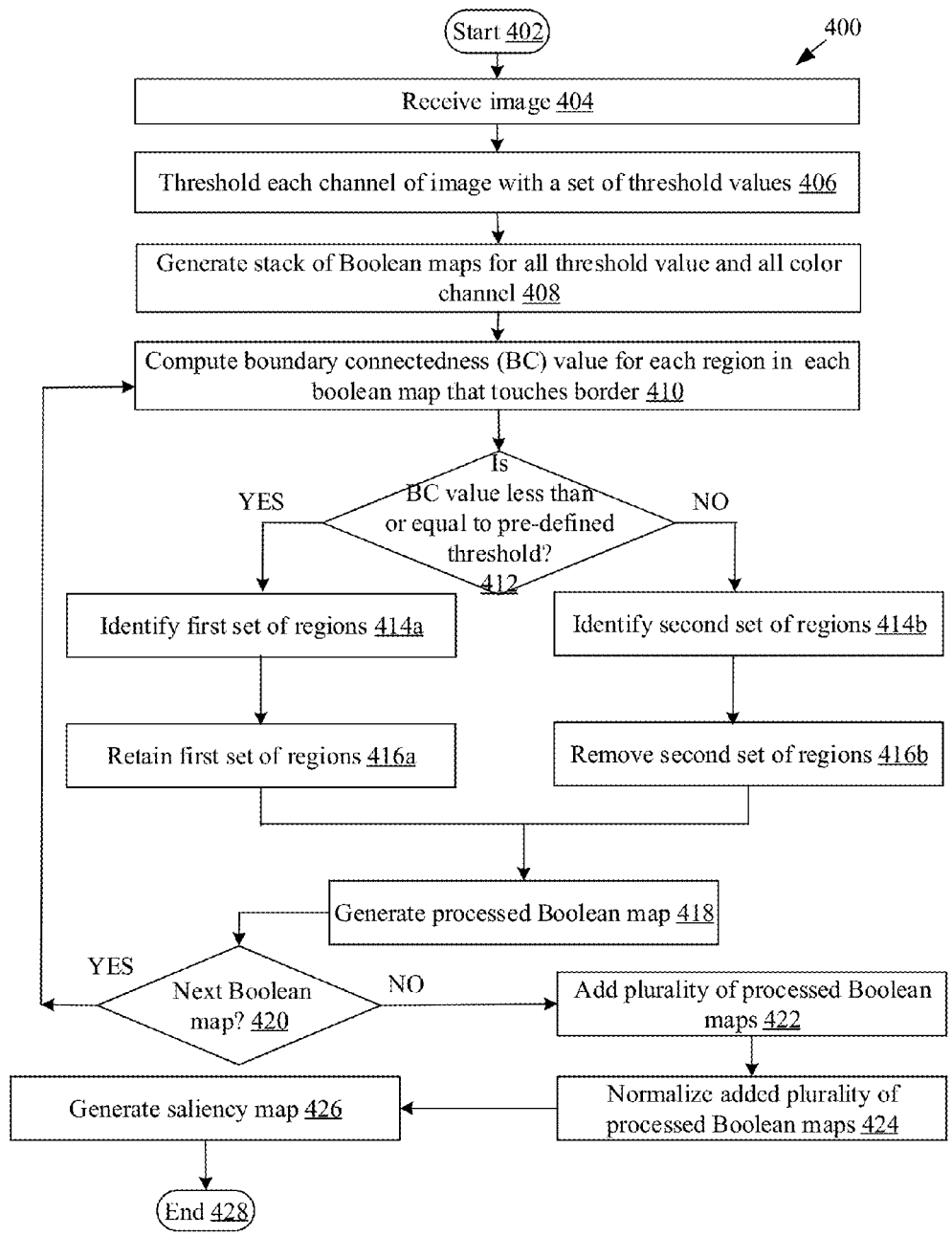
FIG. 4 depicts a flowchart that illustrates a method for image processing, in accordance with an embodiment of the disclosure.

FIG. 4 illustrates a flow chart for implementation of an exemplary method for image processing, in accordance with an embodiment of the disclosure. FIG. 4 is described in conjunction with elements of FIGS. 1, 2, and 3. The method, in accordance with a flowchart 400 in FIG. 4, may be implemented in the image-processing device 102. The image-processing device 102 may be communicatively coupled with the plurality of cloud-based resources 106, as described in FIG. 1.

With reference to FIG. 4, the method, in accordance with the flowchart 400, begins at step 402 and proceeds to step 404. At step 404, an image or a video frame, such as the video frame 302, captured by the imaging unit 204, may be received by the processor 202. The video frame 302 may include a plurality of color channels. At step 404, a de-correlation of the plurality of color channels of the video frame 302 may be optionally performed, based on a whitening operation. The de-correlation of the plurality of color channels in the video frame 302 may be performed to reduce a cross-correlation within the plurality of color channels. In accordance with an embodiment, the de-correlation of the plurality of color channels of the video frame 302 may not be performed. At step 406, a set of threshold values for each color channel of the plurality of color channels in the image may be computed. Such a computation may be performed by the BMG unit 210, in conjunction with the processor 202. The BMG unit 210, in conjunction with the processor 202, may assign a pre-specified binary value to each pixel location of each region in the video frame 302. Such an assignment of the pre-specified binary values may be based on a comparison of the pixel values at each pixel location, with a threshold value for each of the set of threshold values.

At step 408, a plurality or stack, of Boolean maps 304 for each of the computed set of threshold values and each color channels of the one or more channels may be generated by the BMG unit 210. The plurality of Boolean maps 304 may be generated based on the binary values assigned to each pixel location of each region in the video frame 302.

At step 410, a boundary-connectedness value for each region in the plurality of Boolean maps 304 may be computed. Such a computation may be performed by the BOR unit 212, in conjunction with the processor 202. In accordance with an embodiment, the computation of the boundary-connectedness value may be based on a ratio of total count of pixels of the region that touch the border of the Boolean map and a square root of total count of pixels in the region, as described in FIG. 2.

At step 412, it may be determined whether the boundary-connectedness value of each region in the Boolean map exceeds a pre-specified threshold value. For instance, when the boundary-connectedness value of a region is less than or equal to the pre-specified threshold value, the control passes to step 414a. In another instance, when the boundary-connectedness value of the region exceeds the pre-specified threshold value, the control passes to step 414b.

At step 414a, the region may be identified as one of the first set of regions and subsequently, at step 416a, the first set of regions may be retained in the Boolean map by the BOR unit 212 for further processing. Control passes to step 418. At step 414b, the region may be identified as one of the second set of regions and at step 416b, the second set of regions may be removed from the Boolean map by the BOR unit 212 and may not be further processed. Control passes to step 418.

At step 418, a processed Boolean map may be generated by the BOR unit 212, based on the retained first set of regions. At step 420, the processor 202 checks for next Boolean map to be processed. In an instance, when there are more Boolean maps to be processed, the control passes back to 410. In another instance, when there are no more Boolean maps left to be processed, the control passes to step 422.

At step 422, the plurality of processed Boolean maps may be added by the SMG unit 214. At step 424, the added plurality of processed Boolean maps 306 may be normalized by a value that corresponds to a total count of the plurality of Boolean maps 304. The normalization may be performed by the SMG unit 214. At step 426, a saliency map, such as the saliency map 308, may be generated by the SMG unit 214. The saliency map 308 may be generated, based on post-processing of the plurality of normalized plurality of processed Boolean maps and one or more saliency parameters. The SMG unit 214 may be configured to detect a region-of-interest that corresponds to a salient region, such as the salient region 308a, from plurality of regions-of-interest in the generated saliency map 308. Such a detection of the region-of-interest may be based on one or more salient parameters, such as higher intensity of the detected salient regions. Accordingly, the processor 202 may automatically focus on the salient object, such as the first car 302a, in the captured video frame 302. Control passes to end step 428.

In accordance with an embodiment of the disclosure, a system to process an image is disclosed. The system may comprise an image-processing device 102 (FIG. 1), which may be configured to generate a saliency map of an image. The image-processing device 102 may comprise one or more circuits (or processors), such as the processor 202, the BMG unit 210, the BOR unit 212, and the SMG unit 214 (FIG. 2). The BMG unit 210 may be configured to compute a plurality of boundary-connectedness values associated with one or more regions in a plurality of Boolean maps. Further, the plurality of Boolean maps may correspond to a plurality of color channels of an image. The BOR unit 212 may be further configured to compare the plurality of boundary-connectedness values associated with the one or more regions in the plurality of Boolean maps with a pre-specified threshold value. The BOR unit 212 may be configured to identify at least a first set of regions of the plurality of regions in the plurality of Boolean maps as a set of foreground regions, based on the comparison.

Various embodiments of the disclosure may provide a non-transitory computer readable medium and/or storage medium, wherein there is stored thereon, a machine code and/or a computer program with at least one code section executable by a machine and/or a computer to process an image. The at least one code section may cause the machine and/or computer to perform the steps that comprise the generation of a saliency map of an image. A plurality of boundary-connectedness values may be computed, which may be associated with a plurality of regions in a plurality of Boolean maps. The plurality of boundary-connectedness values associated with the plurality of regions may be compared with a pre-specified threshold value. At least a first set of regions of the plurality of regions in the plurality of Boolean maps may be identified as a set of foreground regions, based on the comparison.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A method for image processing, said method comprising:
    computing, by an image-processing device, a plurality of boundary-connectedness values associated with a plurality of regions in a plurality of Boolean maps, wherein said plurality of Boolean maps corresponds to a plurality of color channels of an image;
    comparing, by said image-processing device, said plurality of boundary-connectedness values associated with said plurality of regions with a pre-specified threshold value; and
    identifying, by said image-processing device, at least a first set of regions of said plurality of regions in said plurality of Boolean maps as a set of foreground regions based on said comparison; and
    generating, by said image-processing device, said plurality of Boolean maps for each color channel of said plurality of color channels of said image and each threshold value of a set of threshold values, based on a set of binary values, wherein said set of binary values are determined based on a comparison of pixel intensity with said threshold value at each pixel location of said image.

2. The method according to claim 1, wherein each of said plurality of boundary-connectedness values associated with said plurality of regions is computed based on a ratio of count of pixels of a corresponding region that touches one or more borders of said plurality of Boolean maps, and a square root of total count of pixels of said corresponding region.

3. The method according to claim 1, wherein said image is a de-correlated image that includes one or more regions corresponding to background or foreground objects, wherein said plurality of regions of said one or more regions touches one or more borders of said image, wherein another plurality of regions of said one or more regions does not touch said one or more borders of said image.

4. The method according to claim 1, further comprising computing, by said image-processing device, said set of threshold values of each color channel of said plurality of color channels based on a step size, a minimum pixel value, and a maximum pixel value of a corresponding color channel.

5. The method according to claim 4, wherein said step size is based on a count of bits that represents pixel values of said plurality of color channels.

6. The method according to claim 1, further comprising identifying, by said image-processing device, a second set of regions of said plurality of regions as a set of background regions, based on said comparison, wherein said identified first set of regions are retained and said identified second set of regions are removed from said plurality of Boolean maps to generate a plurality of processed Boolean maps.

7. The method according to claim 6, wherein one or more boundary-connectedness values associated with said first set of regions is less than or equal to said pre-specified threshold value, wherein one or more boundary-connectedness values associated with said second set of regions exceed said pre-specified threshold value.

8. The method according to claim 6, further comprising generating, by said image-processing device, a saliency map, wherein said generation of said saliency map is based on addition of said plurality of processed Boolean maps and normalization of said added said plurality of processed Boolean maps.

9. The method according to claim 8, further comprising detecting, by said image-processing device, a region-of-interest that corresponds to a salient region in said generated saliency map.

10. The method according to claim 9, wherein said detection of said region-of-interest is based on one or more saliency parameters corresponding to said first set of regions identified as a set of foreground regions in said image, wherein said one or more saliency parameters are based on intensity values of said detected salient regions that exceed a threshold saliency value.

11. A system for image processing, said system comprising:
    one or more circuits in an image-processing device, said one or more circuits being configured to:
        compute a plurality of boundary-connectedness values associated with a plurality of regions in a plurality of Boolean maps, wherein said plurality of Boolean maps corresponds to a plurality of color channels of an image;

compare said plurality of boundary-connectedness values associated with said plurality of regions with a pre-specified threshold value;

identify at least a first set of regions from said plurality of regions in said plurality of Boolean maps as a set of foreground regions based on said comparison; and generate said plurality of Boolean maps for each color channel of said plurality of color channels of said image and each threshold value of a set of threshold values, based on a set of binary values, wherein said set of binary values are determined based on a comparison of pixel intensity with said threshold value at each pixel location of said image.

12. The system according to claim 11, wherein each of said plurality of boundary-connectedness values associated with said plurality of regions is computed based on a ratio of count of pixels of a corresponding region touching one or more borders of said plurality of Boolean maps and a square root of total count of pixels of said corresponding region.

13. The system according to claim 11, wherein said one or more circuits are configured to compute said set of threshold values of each color channel of said plurality of color channels based on a step size, a minimum pixel value and a maximum pixel value of a corresponding color channel, wherein said step size is based on a count of bits that represent pixel values of said plurality of color channels.

14. The system according to claim 11, wherein said one or more circuits are configured to identify a second set of regions of said plurality of regions as a set of background regions, based on said comparison, wherein said identified first set of regions are retained and said identified second set of regions are removed from said plurality of Boolean maps to generate a plurality of processed Boolean maps.

15. The system according to claim 14, wherein one or more boundary-connectedness values associated with said first set of regions is less than or equal to said pre-specified threshold value, wherein one or more boundary-connectedness values associated with said second set of regions exceed said pre-specified threshold value.

16. The system according to claim 15, wherein said one or more circuits are configured to generate a saliency map, wherein said generation of said saliency map comprises addition of said plurality of processed Boolean maps and normalization of said added said plurality of processed Boolean maps.

17. The system according to claim 16, wherein said one or more circuits are configured to detect a region-of-interest that corresponds to a salient region in said generated saliency map.

18. The system according to claim 17, wherein said detection of said region-of-interest is based on one or more saliency parameters corresponding to said first set of regions identified as a set of foreground regions in said image, wherein said one or more saliency parameters are based on intensity values of said detected salient regions that exceed a threshold intensity value.

19. A non-transitory computer-readable storage medium having stored thereon, a set of computer-executable instructions for causing a computer comprising one or more processors to perform steps comprising:

computing, by an image-processing device, a plurality of boundary-connectedness values associated with a plurality of regions in a plurality of Boolean maps, wherein said plurality of Boolean maps correspond to a plurality of color channels of an image;

comparing, by said image-processing device, said plurality of boundary-connectedness values associated with said plurality of regions with a pre-specified threshold value;

identifying, by said image-processing device, a first set of regions from said plurality of regions in said plurality of Boolean maps as foreground regions based on said comparison; and generating, by said image-processing device, said plurality of Boolean maps for each color channel of said plurality of color channels of said image and each threshold value of a set of threshold values, based on a set of binary values, wherein said set of binary values are determined based on a comparison of pixel intensity with said threshold value at each pixel location of said image.

* * * * *